United States Patent [19]

Hepworth

[11] Patent Number: 4,660,273
[45] Date of Patent: Apr. 28, 1987

[54] CABLE STRIPPING DEVICE

[75] Inventor: Paul S. Hepworth, Oadby, England

[73] Assignee: Plas Plugs Limited, Derby, England

[21] Appl. No.: 800,401

[22] Filed: Nov. 21, 1985

[30] Foreign Application Priority Data

Jun. 14, 1985 [GB] United Kingdom ............... 8515082

[51] Int. Cl.$^4$ ............................................. H02G 1/12
[52] U.S. Cl. ..................................... 29/566.4; 81/9.43
[58] Field of Search ..................... 29/566.4, 750, 751, 29/752; 7/107, 131; 81/9.43

[56] References Cited

U.S. PATENT DOCUMENTS

| | | | |
|---|---|---|---|
| 2,601,797 | 7/1952 | Holt, Jr. ................ | 81/9.43 |
| 3,125,908 | 3/1964 | Rozmus ................ | 81/9.43 |
| 3,707,099 | 12/1972 | Petz ..................... | 81/9.43 |
| 3,763,723 | 10/1973 | Oprins .................. | 81/9.43 |
| 3,776,069 | 12/1973 | Mugnier ................ | 81/9.43 |
| 4,366,730 | 1/1983 | Casadio ................ | 81/9.43 |
| 4,395,928 | 8/1983 | Undin et al. .......... | 81/9.43 |

Primary Examiner—Z. R. Bilinsky

Attorney, Agent, or Firm—Spensley Horn Jubas & Lubitz

[57] ABSTRACT

The invention relates to a device for stripping an insulation sheath from an end portion of a cable. The device comprises two manually graspable handles (10,11) which are capable of relative movement towards and away from one another, a pair of jaws (14,17) which move towards one another during a first, rotary, part of relative movement of the handles towards each other to grip a cable (C) placed in use between said jaws and a pair of cutter blades (24) disposed adjacent to the jaws and which move towards one another during said first, rotary, part of the handle movement thereby to cut through an outer insulating sheath of said cable, the cutter blades (24) during a second, rectilinear, part of said relative movement of the handles (10,11), moving away from the jaws (14,17) to strip the outer sheath from the cable.

It has been found particularly advantageous that the second part of the movement is approximately parallel in direction to the longitudinal center line of the cutter blades.

7 Claims, 5 Drawing Figures

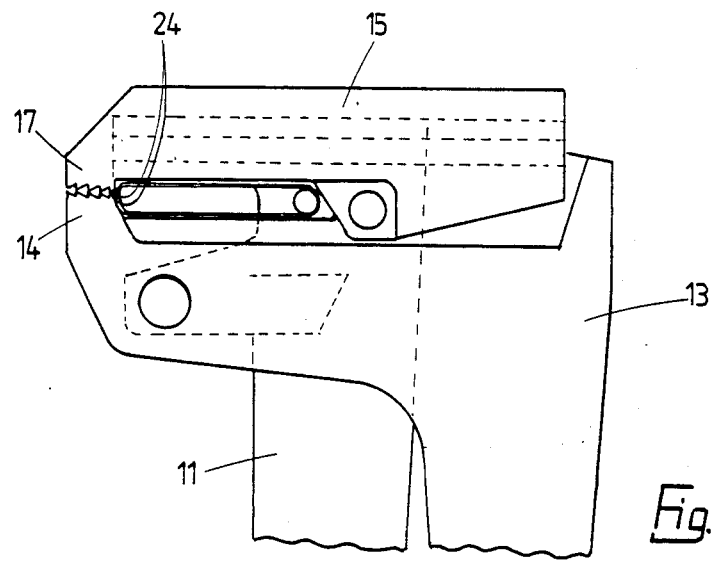
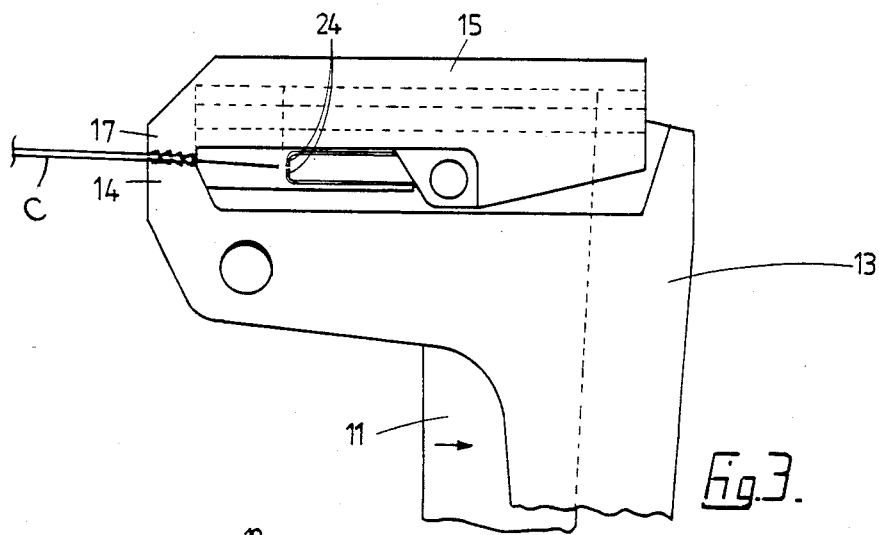
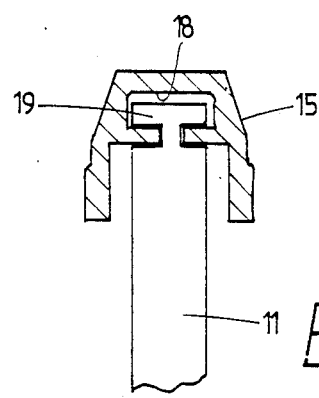
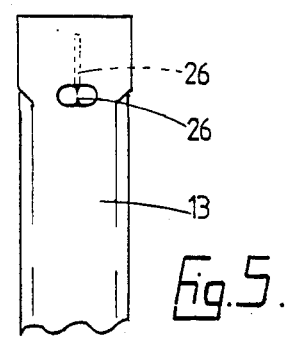

CABLE STRIPPING DEVICE

BACKGROUND OF INVENTION

This invention relates to a device for stripping an outer insulating sheath from an electrical cable to reveal an inner conducting core. Such a device will hence forth be referred to as a cable stripping device.

BRIEF DESCRIPTION OF INVENTION

According to the present invention, there is provided a cable stripping device comprising a pair of manually graspable handles which are manually movable towards one another, a cable stripping device comprising two manually graspable handles which are capable of relative movement towards and away from one another, a pair of jaws which move towards one another during a first, rotary, part of relative movement of the handles towards each other to grip a cable placed in use between said jaws, and a pair of cutter blades disposed adjacent to the jaws and which move towards one another during said first, rotary, part of the handle movement thereby to cut through an outer insulating sheath of said cable, the cutter blades during a second, rectilinear, part of said relative movement of the handles, moving away from the jaws to strip the outer sheath from the cable.

In a preferred construction, a first one of the jaws and a first one of the handles together form a first lever member, the second jaw forms part of a second lever member which is pivotally connected to the first lever member, and the second handle is slidably mounted on the second lever member and carries the cutter blades, whereby during the first, rotary, part of said handle movement, the second lever member and the second handle pivot in unison relative to the first lever member, and during the second, rectilinear, part of said handle movement the second lever member remains stationary relative to the first lever member and the second handle slides rectilinearly relative to the second lever member.

Conveniently, the cutter blades are formed respectively on the ends of a resiliently deformable U-shaped member which is disposed between the first and second lever members, the cutter blades being moved towards and away from one another by relative movement between said members.

It has been found particularly advantageous to the operation of the device if the direction of the second, rectilinear, movement between the handles is parallel or substantially parallel to the longitudinal centre line of the member carrying the pair of cutter blades.

Advantageously, the axis about which the first and second lever members are relatively pivotable passes through the second lever at least during the first part of said handle movement.

Desirably, the device also includes a cable cutter which is operated by means of said handles. The cable cutter may comprise an anvil formed on the first lever member and a cutter blade mounted on the second handle or on the second lever member so as to be movable towards and away from the anvil. The anvil is preferably formed by a side wall of a laterally extending hole in the first lever member.

Conveniently, the device also includes a cutter for separating the cables of a twin cable (e.g. a lamp flex), which cutter is also operated by means of said handles. As with the above-mentioned cable cutter, this cutter can comprise an anvil formed on the first lever member and a cutting blade mounted on the second handle or on the second lever member so as to be movable towards and away from the anvil. The anvil is preferably formed by a side wall of a bore in the first lever member. Most advantageously, the cutting blade of the cutter also constitutes the cutting blade of the cable cutter, and the bore and the hole in the first lever member intercommunicate.

Desirably, movement of the cutter blades towards the jaws is limited by a stop between the second handle and the second lever member, and a spring urges the second handle towards the stop and thereby also urges the first and second levers apart.

Preferably, the handles are disposed closely adjacent to one another so that they can be manually squeezed together, and one handle is recessed to receive the other handle during such squeezing movement.

BRIEF DESCRIPTION OF DRAWINGS

The invention will now be described, by way of example only, with reference to the accompanying drawings, in which:

FIGS. 2 and 3 are scrap side views of the device in various positions during a cable stripping operation;

FIG. 4 is a section on the line IV—IV in FIG. 1; and

FIG. 5 is a view in the direction of arrow V in FIG. 1.

DETAILED DESCRIPTION OF DRAWINGS

Figure 1:
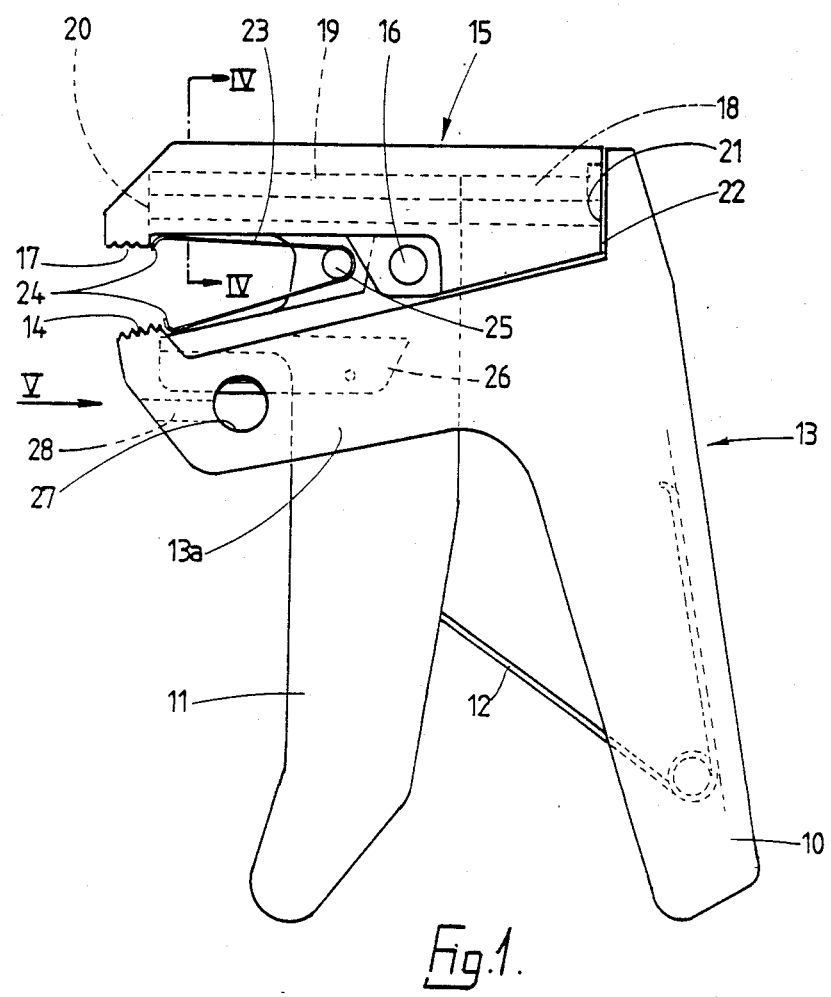
FIG. 1 is a side view of a cable stripping device according to the present invention, shown in a starting position.

Referring first to FIG. 1, the illustrated cable stripping device is composed generally of a pair of handles 10 and 11 which can be manually squeezed together against the action of a spring 12, the handle 10 being recessed to allow the handle 11 to be received therein during such squeezing movement. The handle 10 forms one limb of a first lever member 13 of generally L-shaped configuration, the other limb 13a thereof having a jaw element 14 formed at its free end. A second lever member 15 is mounted on the first lever member 13 for pivotal movement relative thereto about an axis 16, and has a jaw element 17 formed at its free end which confronts the jaw element 14. As can be seen to advantage in FIG. 4, the lever member 15 is generally of inverted U-shaped cross-section and has a rebated recess 18 extending along its base. The handle 11 has a T-shaped projection 19 at its upper end which engages in the recess 18 to enable the handle 11 to slide rectilinearly relative to the lever member 18. The projection 19 extends somewhat forwardly of the handle 11 itself and is urged by the spring 12 into contact with a stop 20 adjacent to the jaw element 17, causing the handle 11 normally to occupy the position illustrated in FIG. 1 wherein the pivot axis 16 passes therethrough. As also illustrated in FIG. 1, pivotal movement of the lever member 15 relative to the member 13 under the influence of the spring is limited by a pair of stops 21 and 22 provided on these members, respectively.

Disposed between the lever members 13 and 15 is a generally U-shaped resilient member 23 having a pair of cutting blades 24 formed at its ends, respectively, these blades normally being positioned closely behind the jaw elements 14 and 17. A slot (not visible in the drawings) is provided in a central portion of the member 23 so that the latter can straddle an upper part of the handle 11 and pass around lugs 25 (only one visible) provided thereon. An upper limb of the member 23 bears against the underside of the extended projection 19 on the handle 11, while a lower limb of the member 23 bears against an upper surface of the limb 13a of the lever member 13.

In order to strip the outer insulating sheath from an electrical cable, the cable, C (FIG. 3), is placed between the jaw elements 14 and 17 and the handles 10, 11 are then manually squeezed. Because of the geometry of the arrangement, during a first part of the squeezing movement the handle 11 and the lever member 15 remain locked together under the force of the spring 12 so that they pivot in unison relative to the lever member 13. This causes the jaw elements 14 and 17 to grip the cable and at the same time causes the cutting blades 24 to cut into the insulating sheath. Under this condition (as depicted in FIG. 2), the lever member 15 can pivot no further and therefore effectively becomes solid with the lever member 13. Therefore, continued squeezing of the handles causes the handle 11 to slide rectilinearly relative to the lever member 15 against the action of the spring 12 (see FIG. 3), thereby withdrawing the cutting blades 24 from the jaw elements 14, 17 and causing the blades to strip the insulating sheath from the cable.

In the illustrated embodiment, it is found that upon release of the handles 10 and 11 the jaw elements 14 and 17 separate to release the cable before the cutting blades 24 have returned to their starting position, thereby avoiding damage to the cut end of the sheath by this return movement of the blades 24. This is thought to result from the frictional resistance to the sliding movement of the projection 19 along the recess 18 combined with the way in which the spring 12 applies a returning force to the various components. Thus, it is not necessary to provide a separate latch mechanism for preventing return of the cutting blades 24 until the jaw elements 14 and 17 have separated, which means that the present device can be made with fewer component parts and therefore at a lower cost. However, this is not to say that such a latch mechanism could not be provided as a safeguard measure, if desired.

In the illustrated embodiment, the cable stripping device is provided with certain accessories to further assist the preparation of an electrical cable for connection to a plug, appliance or the like. A first of these accessories is a cable cutter and is formed by a cutting blade 26 mounted on the handle 11 and an anvil provided by the side wall of a through hole 27 formed in the limb 13a of the lever member 13. A cable can therefore be cut simply by passing it through the hole 27 and squeezing the handles 10 and 11, thereby causing the cutting blade 26 to move against the anvil. A second accessory is a cutter for separating the cables of twin cable (i.e. two cables integrally joined by means of their insulating sheaths). This cutter also utilises the cutting blade 26, but this time in conjunction with a bore 28 which enters the limb 13a from just below the jaw element 14 and which opens into the through hole 27. As can be seen to advantage in FIG. 5, the bore 28 is so shaped that the division between the cables automatically becomes aligned with the cutting blade 26 when the twin cable is inserted into the bore, so that the cables can then be separated simply by squeezing the handles 10 and 11 together.

Although not specifically illustrated, a further accessory may be provided which enables the insulating sheath of a cable to be slit longitudinally, whereby the cut parts of the sheath may be parted to reveal the underlying conductor or conductors. This accessory is advantageously provided by means of a channel formed in the free end of the limb 13a of the member 13 at a position just below the bore 28, into which the cutting blade 26 can be partially extended by squeezing the handles 10 and 11 together as aforesaid. The cable can thus be inserted into the channel and drawn lengthwise therethrough, such that the projecting part of the blade 26 produces the required slit in the sheath.

It is preferred that the major components of the device (i.e. the lever members 13, 15 and the handle 11) are moulded from a suitable plastics material, with the member 23 and the cutting blade 26 being made of metal and being secured to the plastics components by any convenient method, such as by riveting.

I claim:

1. A device for stripping a sheathed cable, comprising:
   a first lever having a first jaw at one end and a first handle at the other end;
   a second lever pivotally connected at a stationary point of said first lever, and having a second jaw and a second handle slidably mounted on said second jaw, so that said second handle is capable of rotary and rectilinear movement relative to said first handle; and
   a set of cutting blades mounted on said second handle adjacent said jaws;
   wherein during a first rotary part of relative movement of said handles towards each other, said second jaw and second handle of said second lever pivot in unison relative to said first jaw and first handle of said first lever, thereby causing said jaws to grip said cable and said cutter blades to cut through the outer sheath of said cable, and during a second rectilinear part of relative movement of said handles, said jaws remain closed and said second handle slides rectilinearly towards said first handle, thereby causing said cutter blades to move away from said jaws to strip the outer sheath from said cable.

2. A cable stripping device as claimed in claim 1, wherein the direction of the second, rectilinear, part of said movement is at least substantially parallel to the longitudinal centre line of the pair of cutter blades.

3. A cable stripping device as claimed in claim 1, wherein the cutter blades are formed respectively on the ends of a resiliently deformable U-shaped member which is disposed between the first and second lever members, the cutter blades being moved towards and away from one another by relative movement between said members.

4. A cable strippping device as claimed in claim 1 wherein the axis about which the first and second lever members are relatively pivotable passes through the second lever at least during the first part of said handle movement.

5. A cable stripping device as claimed in claim 1, wherein a stop is provided between the second handle and the second lever member to limit movement of the cutter blades towards the jaws, there being further provided a spring to urge the second handle towards the stop and thereby also to bias the first and second lever apart.

6. A cable stripping device as claimed in claim 1 wherein there is further provided a cable severing means comprising a cable cutter having an anvil formed on the first lever member and a cutter blade mounted on the second handle or on the second lever member so as to be movable towards and away from the anvil.

7. A cable stripping device as claimed in claim 1 where the handles are disposed closely adjacent to one another one handle being recessed to receive the other handle during a manual squeezing movement.

* * * * *